United States Patent [19]

Reeves

[11] Patent Number: 4,909,115

[45] Date of Patent: Mar. 20, 1990

[54] APPARATUS FOR LOADING A BAND SAW BLADE

[76] Inventor: Steven R. Reeves, 49 Williams Ave., West Valley, N.Y. 14171

[21] Appl. No.: 372,790

[22] Filed: Jun. 29, 1989

[51] Int. Cl.$^4$ .............................................. B26D 1/54
[52] U.S. Cl. ...................................... 83/820; 83/814; 83/816; 83/819
[58] Field of Search .................. 83/820, 814, 816, 819

[56] References Cited

U.S. PATENT DOCUMENTS

| | | | |
|---|---|---|---|
| 3,830,131 | 8/1974 | Wells | 83/814 |
| 4,127,045 | 11/1978 | Blucher et al. | 83/820 |
| 4,327,621 | 5/1982 | Voorhees | 83/820 |
| 4,336,731 | 6/1982 | Eklund | 83/820 |

Primary Examiner—Donald R. Schran
Assistant Examiner—Hwei-Siu Payer
Attorney, Agent, or Firm—William R. Moser; Judson R. Hightower; Richard E. Constant

[57] ABSTRACT

A band saw blade is loaded between pairs of guide wheels upon tensioning the blade by guiding the blade between pairs of spaced guide plates which define converging slots that converge toward the guide wheels. The approach is particularly useful in loading blades on underwater band saw machines used to cut radioactive materials.

6 Claims, 2 Drawing Sheets

APPARATUS FOR LOADING A BAND SAW BLADE

The U.S. Government has rights in this invention pursuant to Contract No. DE-AC11-76PN00014, awarded by the U.S. Department of Energy.

BACKGROUND OF THE INVENTION

The instant invention relates to apparatus for loading a band saw blade. More particularly, the instant invention relates to apparatus for loading a band saw blade remotely, such as, for example, loading the blade in a band saw which is submerged underwater to cut materials such as radioactive materials.

When cutting radioactive materials, it is prudent, if not absolutely necessary, to saw the materials underwater to prevent dispersion of the radioactive materials and to isolate the materials in a contained environment. Normally, band saw machines are used to cut such materials. The band saw machines are completely immersed in water and become radioactive in and of themselves. From time to time, it is necessary to change the blades of the band saw machines. In that the band saw machines have themselves been exposed to radioactive material, it is highly desirable to change the blades while the machine remains immersed.

Prior to the instant invention, it has been necessary to remove the band saw from the water to change its blade, exposing the environment and personnel to additional radiation hazards. An attempt was made to utilize an auxiliary tool in order to rotate the blade underwater, but this turned out to be impractical. Tools previously used to rotate saw blades work only on smaller sized blades and only rotated the blade approximately 45°, whereas, in order to have the machine operate properly, the blade should rotate 90°. Due to the design of a horizontal band saw machine, the blade thereof could not be kept in its proper position on the carrier wheels of the machine if the blade was placed in the blade guides prior to tensioning the blade.

In addition to utilizing a separate tool to rotate the blade, wherein the tool is placed on the blade before the assembly is lowered into the water, development work has been done on a rotating guide which allows the blade to be loaded over the carrier wheels and into the guides, which guides are rotated to twist the blade after the blade is fully tensioned. The rotating guide concept requires a separate tool for positioning the blade precisely in order to load the blade into the guides.

These prior art approaches are relatively complex and require proximity of personnel to the band saw machine and radioactive water in which it is immersed for an undesirable period of time. Accordingly, there is a need for method of and apparatus for loading underwater band saws, which is simpler and quicker so as to require less exposure of personnel and apparatus to the hazardous radioactive environs associated with the band saw machine and water bath in which it is immersed.

SUMMARY OF THE INVENTION

It is an object of the instant invention to provide new and improved apparatus for loading blades into a band saw machine.

The invention comprises apparatus for rotating a band saw blade having a cutting edge and noncutting edge disposed between a pair of flat surfaces utilizing a pair of spaced loading blocks. Each loading block includes a pair of opposed guide plates defining a slot therebetween. The loading blocks are rigidly held in one orientation with the slot between the guide plates being oriented vertically; the slot between the guide plates being defined by sloping surfaces which engage the noncutting and cutting edges of the band saw as the band saw is tensioned to rotate the band saw from an untensioned mode in which the side of the saw is oriented horizontally to a tension mode in which the side of the saw is oriented vertically so as to be positioned between a pair of vertically extending guide surfaces.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein:

FIG. 3a and 3B perspective views showing the band saw blade being tensioned by moving the carrier wheels of the band saw machine further apart so as to move the blades into the aligning blocks; and FIG. 4 is a perspective view showing the blade tensioned and aligned within the blocks so that the blade is twisted 90° for cutting in a direction perpendicular to the axes of the carrier wheels of the band saw blade machine.

DESCRIPTION OF THE PREFERRED EMBODIMENT

Figure 1:
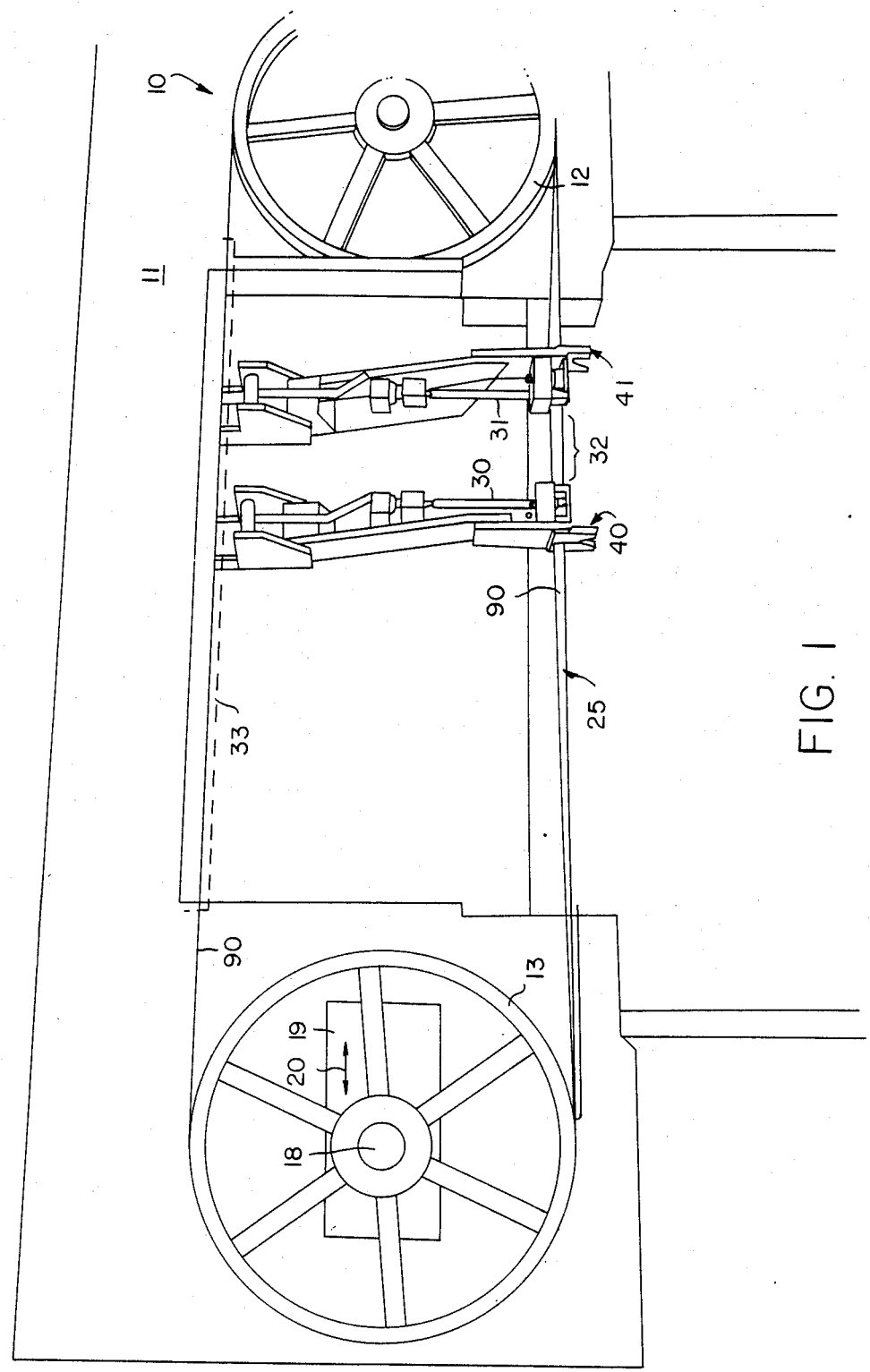
FIG. 1 is a side view showing a band saw machine incorporating the features of the instant invention.

Referring now to FIG. 1, there is shown a band saw machine, designated generally by the numeral 10, configured in accordance with the principles of the instant invention. The band saw machine comprises a frame 11 on which first and second carrier wheels 12 and 13 are mounted. The first carrier wheel 12 is rotated by an electric motor (not shown) positioned above the frame 11 driving the first carrier wheel through a conventional linkage such as an elongated drive shaft (not shown) or perhaps a chain (not shown) geared to the axis of the first carrier wheel. The second carrier wheel 13 has an axis 18 which is mounted in a slidable block 19 which is movable in the directions of arrow 20 by a hydraulic cylinder (not shown). Looped around the first and second carrier wheels 12 and 13 is a bandbblade 25. The entire band cutting saw machine 10 is immersed in water to cut radioactive materials such as plutonium, which are kept underwater. The band cutting machine 10 is immersed vertically; in other words, the carrier wheels 12 and 13 extend vertically with their axes extending horizontally.

In order to make vertical cuts, the blade 25 is oriented vertically for a portion of its length between band saw blade guides 30 and 31 which define therebetween a sawing or cutting zone 32. The material to be cut (not shown) is placed between the guides 30 and 31 and within the cutting zone 32 so as to be cut by the saw blade as it traverses the cutting area 32.

After the band saw blade 25 has cut a number of items, it is necessary to replace the band saw blade. In order to minimize exposure to radiation, it is preferable to retain the entire machine 10 submerged while the band saw blade 25 is changed. While underwater, the hydraulic cylinder is activated so as to move carrier wheel 13 toward carrier wheel 12 and thereby loosen the worn band saw blade 25 so that it can be conveniently removed from the first and second carrier wheels. Alternatively, the blade 25 can be itself cut so that it drops away. A new band saw blade 25 is then placed upon the wheels 12 and 13 while the wheel 13 is in a position shifted toward the wheel 12. Initially, the band saw blade 25 will be slack and lie with its flat inner side against the outer peripheral surfaces of the carrier wheels 12 and 13. The band saw blade 25 also rests on a grooved shelf 33 (dotted lines) positioned tangent to the top surfaces of the carrier wheels 12 and 13 so that the sag occurs along the lower run of the band saw blade 25. In accordance with the principles of the instant invention, as the second carrier wheel 13 moves to the left or away from the first carrier wheel 12, the band saw blade 25 twists so as to acquire a vertical orientation in the cutting zone 32. As is seen in FIGS. 2-4, this is accomplished by a pair of band saw guides designated generally by the numerals 40 add 41.

Figure 2:
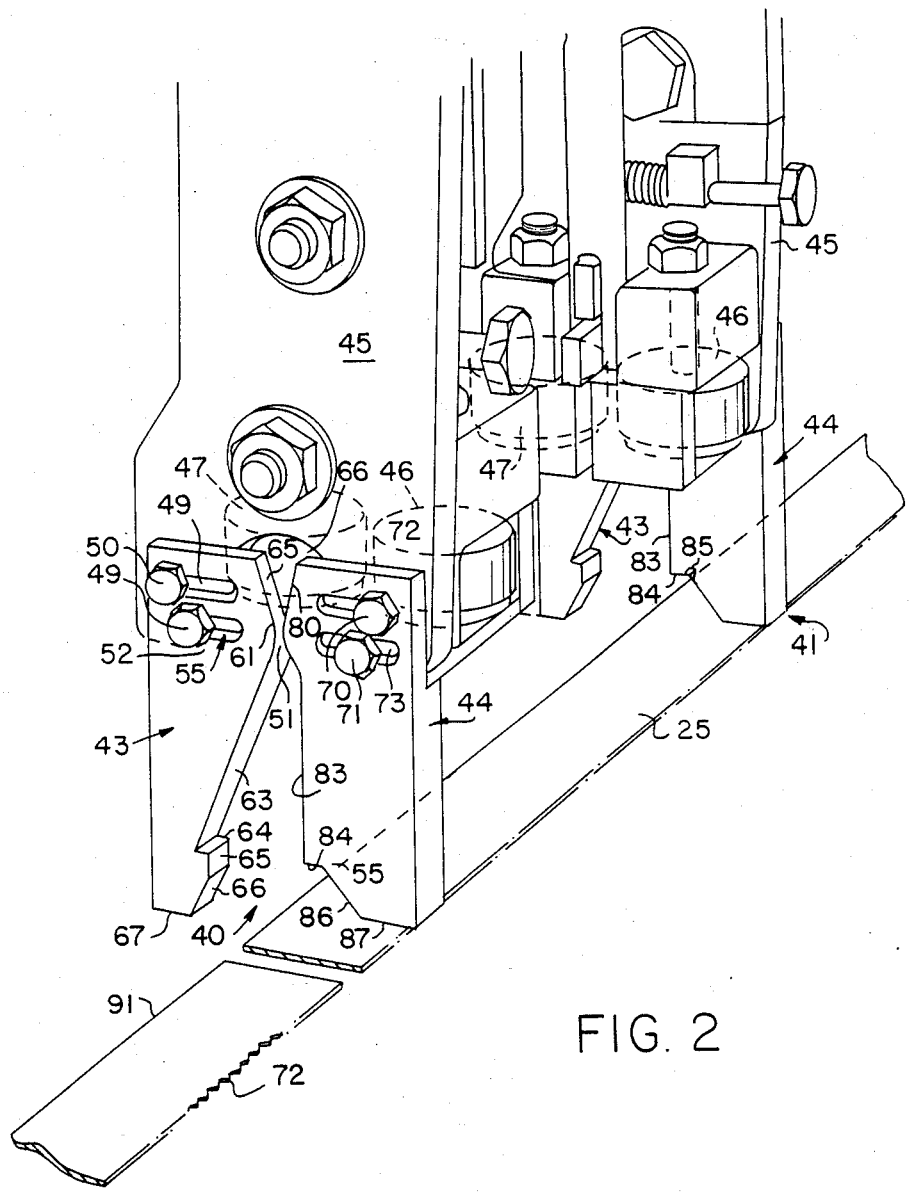
FIG. 2 is a perspective view of blade guide showing the band saw blade in its slack configuration.

Referring now more specifically to FIGS. 2-4, the band saw guides 40 and 41 are each comprised of first and second plates designated generally by the numerals 43 and 44, respectively, the plates being positioned on opposite sides of the band saw blade 25. Each of the plates 43 and 44 is secured to a supporting strut 45 which also retains a pair of opposed rollers 46 and 47 which form the guides 40 and 41 between which the band saw blade 25 passes while it runs. The guide plate 43 has a pair of horizonally extending slots 55 and 48 which receive bolts 49 and 50, respectively, to rigidly to limit sliding motion of the plate 43 in the horizontal direction. The plate 43 also includes a shoulder 51 which fits beneath and engages the bottom surface 52 of the strut 45.

The plate 43 has a first sloping surface 60 which slopes toward a rounded crown 61 which is aligned with an opening 62 in the strut 45 which supports the guide plates 43 and 44 and the rollers 46 and 47. A second sloping surface 63 slopes away from the crown 61 and terminates at a shoulder 64. The shoulder 64 protrudes a short distance from the surface 63 and terminates in a vertical surface 65 which extends downwardly a short distance before intersecting a slanted surface 66 which slants back away from the vertical surface 65 and terminates in a horizontal surface 67.

Guide plate 44 which is positioned opposite guide plate 43 is held on the support strut 45 by bolts 70 and 71 which extend through horizontal slots 72 and 73 respectively, therein so as to be horizontally adjustable while being restrained from rotation. The guide plate 44 has a first sloping surface 80 which slopes toward a crown 81 directly opposite the sloping surface 60 of guide plate 43 to form a V-shaped slot with the surface 60 that is aligned with the opening 62 in mounting strut 45. Just below the crown 61, the guide plate 44 curves away from the plate 43 with a curved surface 82. The curved surface 82 joins with a straight vertical surface 83 which extends a considerable distance, greater than the width of the saw blade 25 downwardly to an abrupt shoulder 84 which extends back away from the slot between blocks 44 and 43 to a notch 85. Extending downwardly from the notch 85 is a sloping surface 86 which terminates in a horizontal surface 87. The guide plates 43 and 44 are utilized at both guides 40 and 41 and, as set forth hereinafter and shown in FIGS. 2-5, cause the saw blade 25 to twist as it is tensioned by moving carrier wheel 13 away from carrier wheel 12.

As is seen in FIG. 2, the saw blade 25 is draped around the carrier wheels 12 and 13 (FIG. 1) and generally has its flat outer surface 90 facing upwardly and oriented horizontally. As is seen in FIGS. 3 and 4, as the blade is tensioned, the unserrated edge 91 strikes the surface 66 on loading block 43 which urges band blade 25 toward the loading block 44 where the sawtooth edge 92 engages sloping surface 86 on the block 44. As the blade 25 is tensioned further, it rotates in the direction of arrow 93, slides up surface 63 while pivoting on the juncture of surfaces 84 and 83 on block 44, until the blade abuts slanted surface 63. Continued tensioning of the band saw blade 25 then finally pulls the blade up to the position of FIG. 4 where the surface 90 of the blade assumes a vertical attitude and the blade is positioned between rollers 46 and 47. The blade 25 is now positioned for cutting vertically through the items which are to be cut. As is seen in FIG. 1, the band saw blade 25 has its surface 90 positioned as an inner surface for engaging the periphery of the carrier wheels 12 and 13 while running around the wheels but is oriented in the cutting zone 32 so that the serated, or toothed, edge 92 faces downwardly with the surface 90 oriented vertically.

By utilizing the blocks 43 and 44, band saw blade 25 can be conveniently replaced without utilizing special tools. Moreover, this can be accomplished underwater so that it is no longer necessary to remove the band saw machine 10 from its underwater cutting location in order to change the blade 25.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Apparatus for rotating a band saw blade having a cutting edge and noncutting edge disposed between a pair of flat surfaces, the apparatus comprising a pair of spaced loading block means wherein each loading block means comprises a pair of opposed guide plates defining a slot therebetween, the loading block means being rigidly held in one orientation with the slot between the guide plates being oriented vertically; the slots between the guide plates being defined by sloping surfaces which engage the noncutting and cutting edges of the band saw as the band saw is tensioned to rotate the band saw from an untensioned mode in which the side of the saw is oriented horizontally to a tension mode in which the side of the saw is oriented vertically whereby the saw is positioned between a pair of vertically extending guide surfaces.

2. The apparatus of claim 1, wherein the surfaces defining the slot converge toward one another in an upward direction.

3. The apparatus of claim 1, wherein the first guide plate has a plurality of surfaces which engage the noncutting edge of the saw blade while the second guide plate has surfaces which engage the cutting edge of the saw blade.

4. The apparatus of claim 3, wherein the first guide plate has a first surface extending inwardly toward the slot which engages the noncutting edge of the saw blade and shifts the saw blade toward a first inwardly sloping surface on the second guide plate, the first guide plate further having an abrupt horizontally extending shoulder allowing the noncutting edge of the saw blade to move laterally into engagement with the surface which slants inwardly to define the converging geometry of the slot as the blade pivots on a shoulder on the second guide block, the second guide block having a vertically extending surface which is disposed opposite the slanted surface on the first guide block whereby as tension is increased on the saw blade the saw blade assumes an orientation with the flat surfaces extending vertically and with the cutting edge facing downwardly.

5. The apparatus of claim 4, wherein the second plate includes a notch disposed between the horizontally extending shoulder and first inwardly sloping surface.

6. The apparatus of claim 5 wherein the vertically extending surface of the second guide plate and slanting surface of the first guide plate terminate in oppositely disposed crowns between which the flat surfaces adjacent the noncutting edge of the saw blade are disposed when the saw blade is tensioned so as to be positioned between the guide means.

* * * * *